(12) United States Patent
Wu et al.

(10) Patent No.: US 6,952,426 B2
(45) Date of Patent: Oct. 4, 2005

(54) METHOD AND APPARATUS FOR THE TRANSMISSION OF SHORT DATA BURSTS IN CDMA/HDR NETWORKS

(75) Inventors: Geng Wu, Plano, TX (US); David Paranchych, Richardson, TX (US); Farid Khafizov, Plano, TX (US)

(73) Assignee: Nortel Networks Limited, St. Laurent (CA)

( * ) Notice: Subject to any disclaimer, the term of this patent is extended or adjusted under 35 U.S.C. 154(b) by 971 days.

(21) Appl. No.: 09/732,260

(22) Filed: Dec. 7, 2000

(65) Prior Publication Data

US 2002/0071445 A1 Jun. 13, 2002

(51) Int. Cl.[7] .............................................. H04B 7/216
(52) U.S. Cl. ...................... 370/441; 370/311; 370/312
(58) Field of Search ................................ 370/310–313, 370/329–332, 335, 342, 350, 432, 436, 441; 455/450, 464

(56) References Cited

U.S. PATENT DOCUMENTS

| 6,216,008 | B1 | * | 4/2001 | Lee ............................. 455/466 |
| 6,289,217 | B1 | * | 9/2001 | Hamalainen et al. ........ 455/425 |
| 6,442,152 | B1 | * | 8/2002 | Park et al. ................... 370/341 |
| 6,456,604 | B1 | * | 9/2002 | Lee et al. .................... 370/328 |
| 6,480,476 | B1 | * | 11/2002 | Willars ........................ 370/311 |
| 6,757,270 | B1 | * | 6/2004 | Kumar et al. ................ 370/342 |
| 2001/0040877 | A1 | * | 11/2001 | Love et al. .................. 370/329 |
| 2002/0055364 | A1 | * | 5/2002 | Wang et al. ................. 455/466 |

OTHER PUBLICATIONS

CDMA/HDR: "A Bandwidth–Efficient High–Speed Wireless Data Service for Nomadic Users", by Paul Bender, Peter Black, Matthew Grob, Roberto Padovani, Nagabhushana Sindhushayana, and Andrew Viterbi, QUALCOMM, Incorporated, IEEE Communications Magazine, Jul. 2000, pp. 70–77.

TIA/IS–856, "1XEV DO cdma2000 High Rate Packet Data Air Interface Specification," Oct. 2000.

TIA/EIA/IS–2000–3–A–1, "Medium Access Control Standard for cdma2000 Spread Spectrum Systems—Release A, Addendum 1," Nov. 2000.

TIA/EIA/IS–637–A, "Short Message Services for Spread Spectrum Systems," Dec. 1999.

* cited by examiner

Primary Examiner—John Pezzlo
Assistant Examiner—Saba Tsegaye
(74) Attorney, Agent, or Firm—Hayes and Boone, LLP (57) ABSTRACT

A method and apparatus for the transmission of short data bursts in CDMA/HDR networks. Dormant access terminals are assigned to a common traffic channel and rate group by an access point. The access point then informs the access terminals of the assigned common traffic channels and rate groups. The access point then transmits short data bursts to the dormant access terminals using the assigned common traffic channels and rate groups. If an access terminal fails to acknowledge receipt of a short data burst, then the access terminal is re-assigned to a new common traffic channel and rate group and transmission of the short data bursts is re-attempted. If an access terminal fails to acknowledge receipt of a short data burst more than a predetermined number of times, then the access terminal is placed in an active mode of operation. The transmission of short data bursts may be further assigned to time slots within the common traffic channels and rate groups in order to conserve the resources of the access terminals.

37 Claims, 12 Drawing Sheets

METHOD AND APPARATUS FOR THE TRANSMISSION OF SHORT DATA BURSTS IN CDMA/HDR NETWORKS

I. TECHNICAL FIELD

This application relates generally to communication systems and, more particularly, to a method and apparatus for the transmission of short data bursts in a communication network.

II. BACKGROUND

Figure 1:
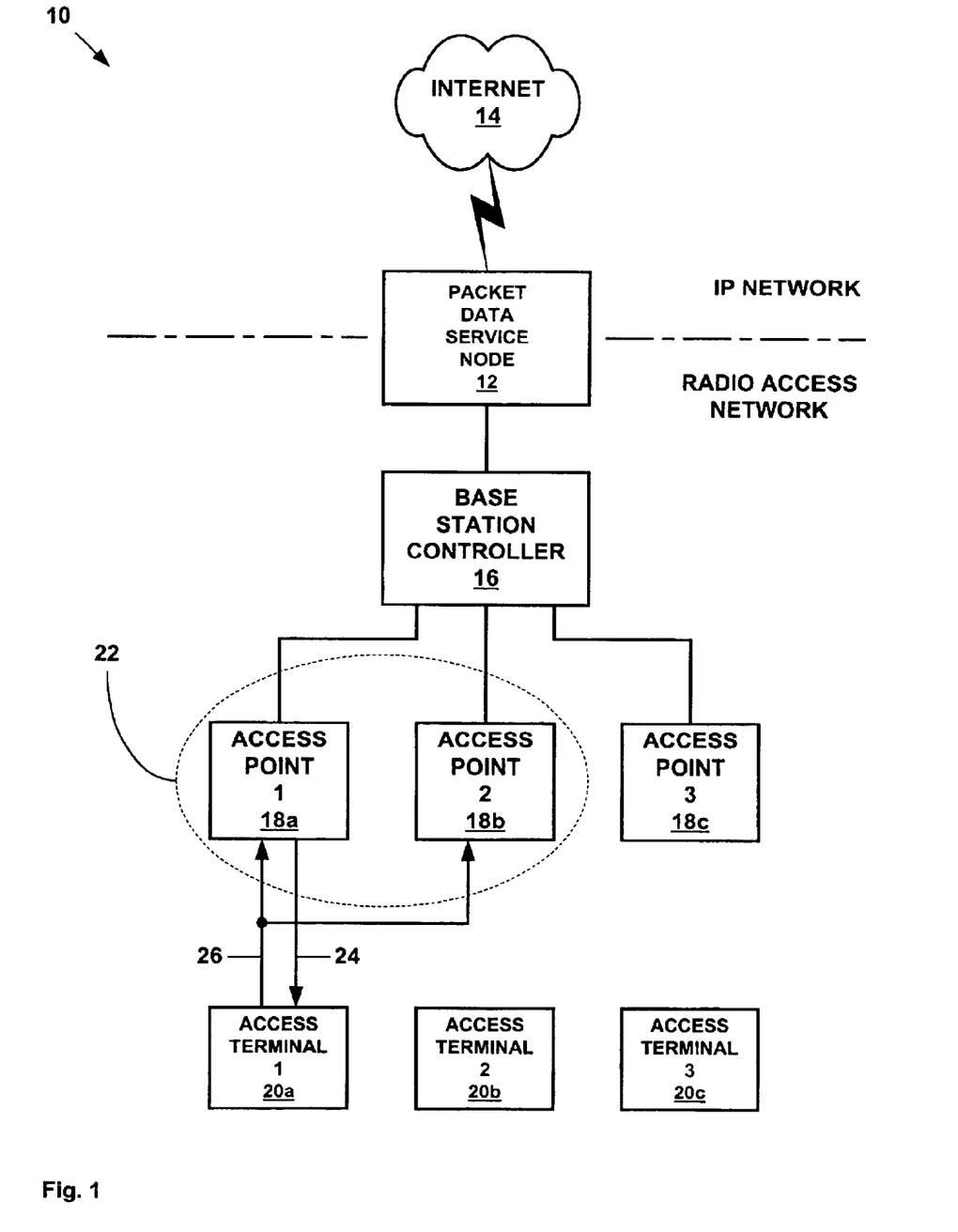
FIG. 1 is a schematic view of an illustrative embodiment of a CDMA/HDR communication network.
Figure 2A:
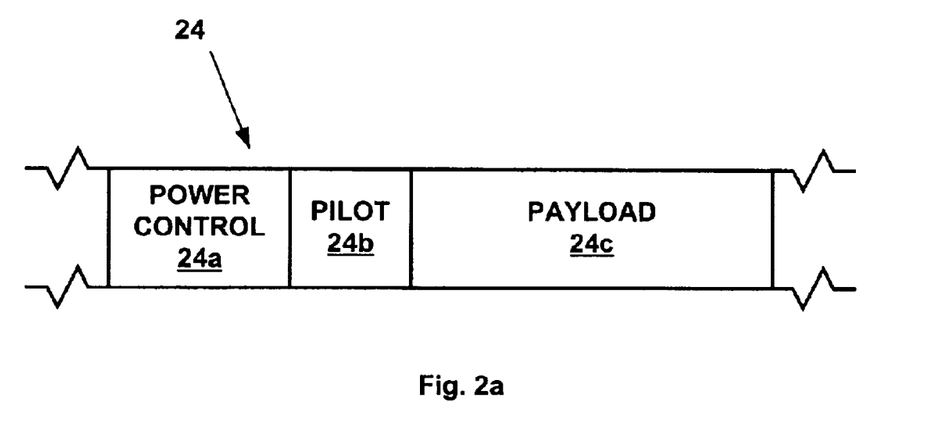
FIG. 2a is a schematic view of an illustrative embodiment of the communication during the forward communication link between the access points and access terminals of the network of FIG. 1.
Figure 2B:
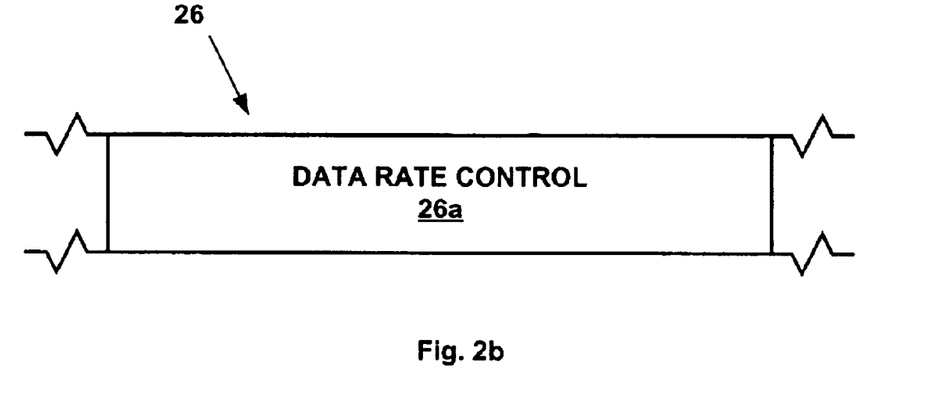
FIG. 2b is a schematic view of an illustrative embodiment of the communication during the reverse communication link between the access points and access terminals of the network of FIG. 1.

Referring to FIGS. 1, 2a and 2b, an illustrative embodiment of a conventional code division multiple access/high data rate (CDMA/HDR) communication network 10 may include a packet data service node (PDSN) 12 that is operably coupled to the Internet 14 and a base station controller (BSC) 16 that is operably coupled to access points (APs)18a, 18b, and 18c. Access terminals (ATs) 20a, 20b, and 20c in turn may be operably coupled to one or more of the APs 18a, 18b, and 18c.

As will be recognized by persons having ordinary skill in the art, the term CDMA/HDR communication network generally refers to a wireless communication network that typically utilizes a combination of time division multiple access (TDMA) and CDMA techniques. In an illustrative embodiment, each communication channel is shared among several users, but on an as-needed basis rather than a fixed time slot as in TDMA. An example of a CDMA/HDR communications network is the wireless communication network available from Qualcomm, Inc. that, in an illustrative embodiment, provides a 2.4 Mbps peak data rate in a standard 1.25 MHZ CDMA bandwidth.

During operation of the network 10, in an illustrative embodiment, an active set 22 of APs may communicate with the AT 20a utilizing a wireless forward communication link 24 and a wireless reverse communication link 26. In an illustrative embodiment, at any given time period, only one of the APs in the active set 22 may communicate with the AT 20a in the forward communication link 24. By contrast, in the reverse communication link 26, the AT 20a may communicate with one or more of the APs in the active set 22.

Furthermore, during operation of the network 10, in an illustrative embodiment, in the forward communication link 24, the APs 18 may transmit a power control signal, a pilot signal, and/or a data payload to the ATs 20 using a power control channel 24a, a pilot channel 24b, and/or a data payload 24c channel, respectively. As will be recognized by persons having ordinary skill in the art, the power control signal will typically be transmitted using a medium access control (MAC) channel, and the data payload will typically be transmitted using a traffic/control channel. In an illustrative embodiment, the power control signal controls the power of the signals transmitted by the corresponding AT 20. Thus, in this manner, the power level of signals transmitted by a particular AT 20 is controlled by one or more of the APs 18. In an illustrative embodiment, in the reverse communication link 26, the ATs 20 may transmit data rate control signals to the APs 18 using a data rate control channel 26a. In an illustrative embodiment, the data rate control signals control the rate of data transmitted by the corresponding AP 18 to a particular AT 20 as a function of the carrier to interference ratio (C/I) for the pilot signal transmitted by the corresponding AP to the particular AT. Thus, in this manner, the rate of data transmission from a particular AP 18 to a particular AT 20 is controlled as a function of the calculated C/I for the pilot signal 24b that was transmitted from the particular AP 18 to the particular AT 20.

Conventional CDMA/HDR networks 10 suffer from a number of limitations. For example, as a practical matter, an AP 18 can only provide power control and/or pilot signals to about 59 ATs 20 at a time. Furthermore, since the ATs 20 may also be communicating with multiple APs 18, as a practical matter, an AP 18 can typically only provide power control and/or pilot signals to about 40 ATs 20 at a time. Thus, there is a physical limit to the number of ATs that can be controlled by an AP 18 during normal operation.

In addition, during typical operation of the network 10, not all of ATs 20 may require transmission of data at high transmission rates as is typically provided in a conventional CDMA/HDR network. Thus, the total resources of the communication network 10 may be inefficiently utilized.

The present invention is directed to improving the efficiency of utilization in CDMA/HDR communication networks.

III. SUMMARY

According to one aspect of the present invention, a method of operating access points in a CDMA/HDR communications network including access terminals capable of operation in an active or a dormant mode of operation is provided that includes one or more of the access points detecting that one or more of the access terminals are operating in or transitioning to a dormant mode of operation, one or more of the access points assigning one or more of the dormant access terminals to one or more corresponding common traffic channels, and one or more of the access points transmitting short data bursts to one or more of the dormant access terminals using the assigned corresponding common traffic channels.

According to another aspect of the present invention, a method of operating access terminals capable of operation in an active mode of operation or a dormant mode of operation in a CDMA/HDR communications network including one or more access points is provided that includes operating one or more of the access terminals in the dormant mode of operation, and one or more of the dormant access terminals receiving short data bursts within common traffic channels assigned to the dormant access terminals.

The present embodiments of the invention provide a number of advantages. For example, the transmission of short data bursts to the dormant access terminals using common traffic channels permit data transmissions at reduced speed to a plurality of access terminals for whom high data rates may not be required. In this manner, data transmission to the access terminals is provided without having to utilize the high degree of overhead, such as power control and rate control, typically required during an active mode of operation. Thus, a large number of low data rate users can be supported and the overall resources of the communication network are more efficiently utilized. Furthermore, the transmissions of short bursts of data may use a specific data rate for each specific rate group and/or time slot within the common traffic channels. In this manner, the transmission data rate may be maximized while the reliability of the data transmissions may be enhanced. Furthermore, limiting the transmission of data to predefined and specific time slots limits the amount of resources of the access terminals that must be utilized to receive and process the short data bursts. In this manner, the overall operational efficiency of the access terminals are further enhanced, and the access terminal power consumptions are reduced.

V. DETAILED DESCRIPTION

Referring to FIGS. 3a, 3b, 3c, 4a, and 4b, the reference numeral 100 refers, in general to a method of operating the CDMA/HDR communications network 10 to permit the APs 18 to transmit short data bursts to the ATs 20 in which an AP 18 may initially determine if: (1) an AT 20 is operating in an active mode of operation, or (2) the AT is transitioning to, or operating in, a dormant mode of operation in step 102.

As will be recognized by persons having ordinary skill in the art, in a conventional CDMA/HDR communication network, an AT 20 may operate in either an active or dormant mode of operation. When operating in the active mode of operation, in an illustrative embodiment, the ATs 20 communicate with the APs 18 substantially as described above in the Background. In particular, in an active mode of operation, data is transmitted from the APs 18 to the ATs 20 at high rates of transmission that are controlled by the data rate control signals transmitted by the ATs 20 to the APs 18. By contrast, when operating in a dormant mode of operation, in a conventional CDMA/HDR communication network, an AT 20 does not receive data transmissions from the APs 18. However, the present illustrative embodiments utilize the dormant mode of operation of the ATs 20 to permit the APs 18 to transmit short data bursts to the ATs thereby increasing the efficiency of utilization of the CDMA/HDR network 10.

Figure 3A:
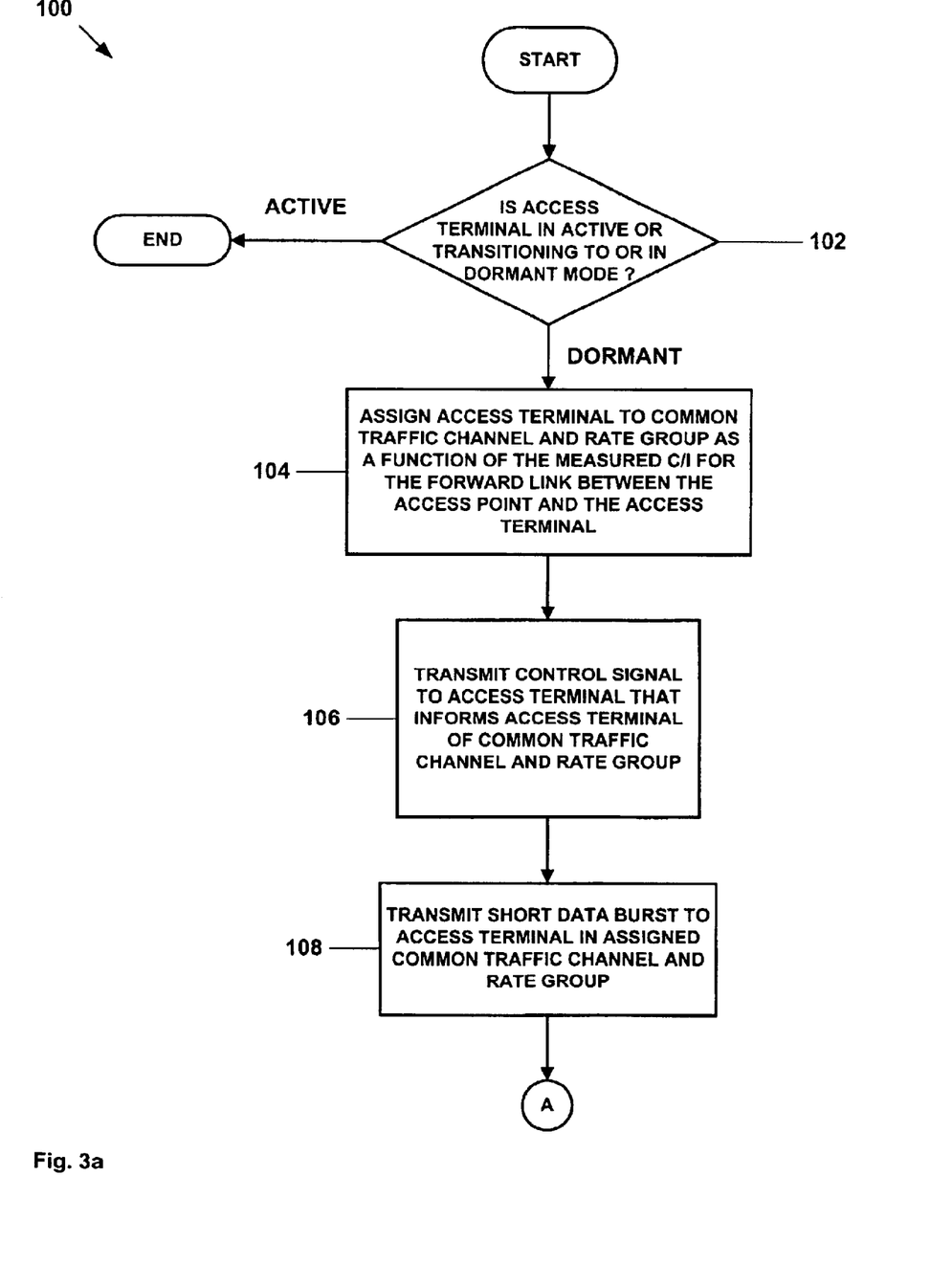
FIGS. 3a–3c are a block diagram of an illustrative embodiment of a method of operating the CDMA/HDR communication network of FIG. 1.

If the AT 20 is transitioning to, or operating in, a dormant mode of operation in step 102, then the AP 18 may assign the AT 20 to a common traffic channel and rate group as a function of the measured C/I for the forward communication link between the AP 18 and the AT 20 in step 104. The measured C/I for the forward communication link between the AP 18 and the AT 20 may be provided, for example, by the AT transmitting the measured C/I for the forward communication link to the AP and/or by the AP averaging the measured C/I for the forward communication link provided by the AT prior to entering the dormant mode of operation.

In an illustrative embodiment, the network 10 defines a contiguous or discontiguous communication control traffic channel for data, having one or more rate groups, that may be transmitted by the AP 18 to the AT 20 in the forward communications link 24. In an exemplary embodiment, the rate group defines the rate of data transmission within at least a portion of the common traffic channel. For example, the network 10 may include a plurality of contiguous or discontiguous rate groups, with each rate group having an assigned data transmission rate. In this manner, a particular AP 18 may transmit data to a plurality of dormant ATs 20, with each AT 20 assigned to a different rate group. In an exemplary embodiment, the rate of data transmission within the rate groups to the ATs 20 during the dormant mode of operation is less than the rate of data transmission to the ATs 20 during the active mode of operation.

Once the AT 20 has been assigned to a common traffic channel and rate group in step 104, the AP 18 may transmit a control signal to the AT 20 using a control channel that informs the AT of the common traffic channel and rate group assigned to the AT in step 106. The AP 18 may then transmit a short data burst to the AT 20 using the assigned common traffic channel at a data rate corresponding to assigned rate group in step 108.

Figure 4A:
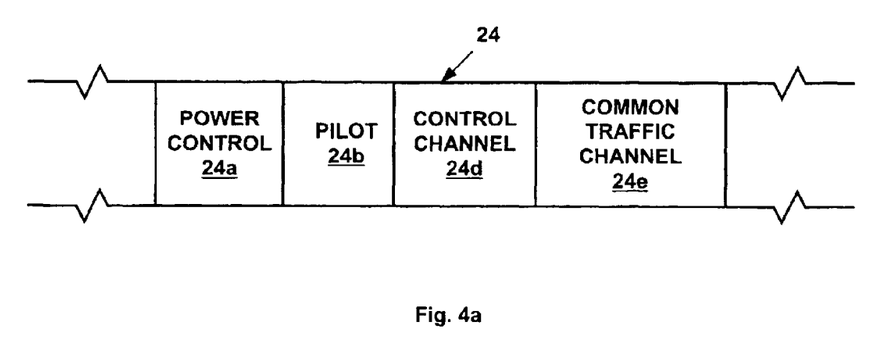
FIG. 4a is a schematic illustration of an embodiment of a forward communication link transmission including a common traffic channel.

Thus, in an exemplary embodiment, as illustrated in FIG. 4a, during steps 104, 106 and 108, the forward communications link 24 between the AP 18 and the AT 20 may include the power control channel 24a, the pilot channel 24b, a control channel 24d for transmitting the control signal to the AT, and a common traffic channel 24e for transmitting data to the AT. The pilot signal transmitted using the pilot channel 24b may be received and processed by the AT 20 to generate a measured C/I for the forward communication link 24. The measured C/I may then be transmitted from the AT 20 to the AP 18. The measured C/I may then be used by the AP 18 to assign the AT 20 to a particular control channel and rate group. The control channel 24d may then be used to transmit the common traffic channel and rate group assigned to the AT 20 to the AT. The common traffic channel 24e may then be used to transmit a short data burst within the common traffic channel and rate group assigned to the AT 20 using the data rate for the assigned rate group.

Figure 4B:
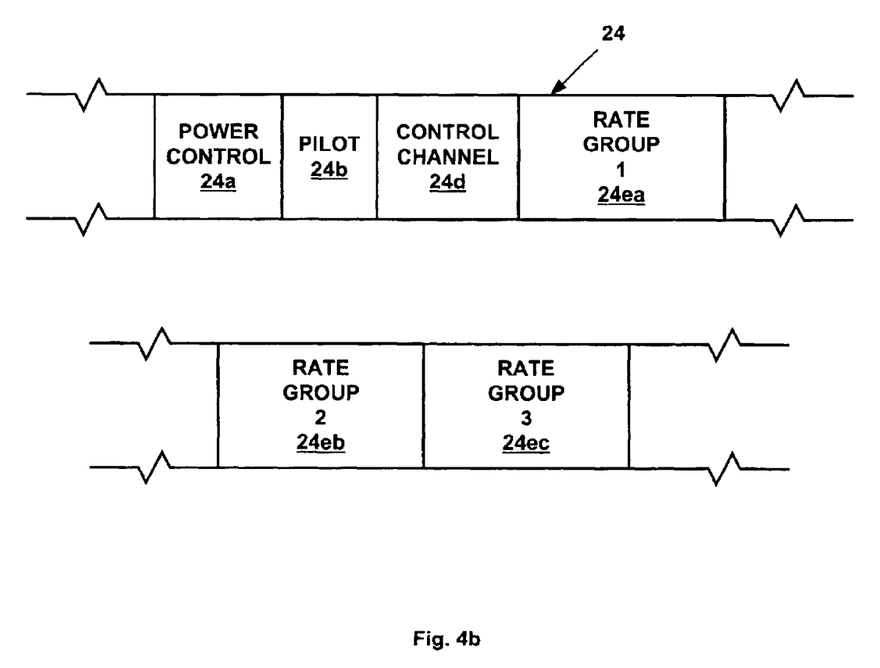
FIG. 4b is a schematic illustration of another embodiment of a forward communication link transmission including a plurality of rate groups.
Figure 4C:
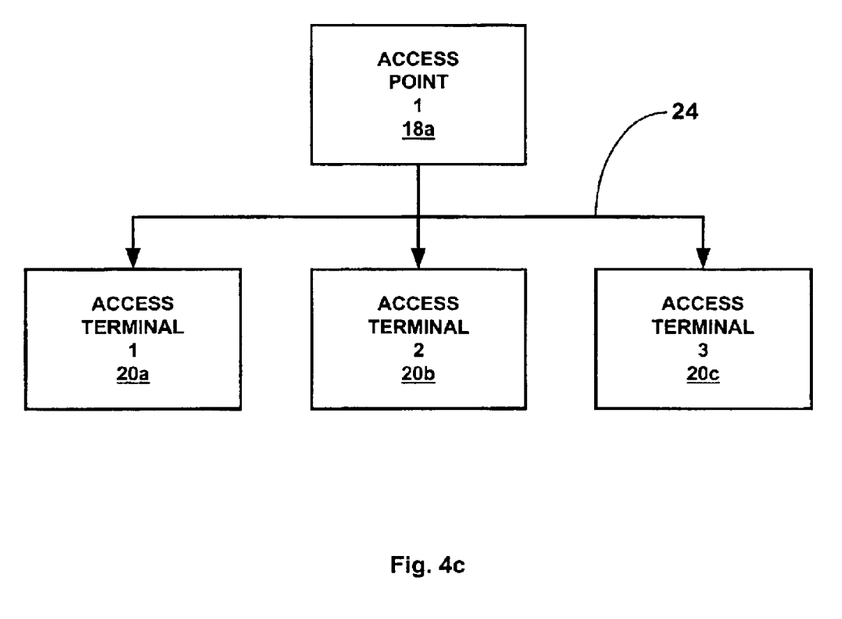
FIG. 4c is a schematic illustration of the transmission of short data bursts to a plurality of access terminals.

More generally, as illustrated in FIGS. 4b and 4c, for the AP 18a transmitting short data bursts to dormant ATs, 20a, 20b, and 20c, using the method 100, the forward communications link 24 between the AP and the ATs may include the power control channel 24a, the pilot channel 24b, the control channel 24d, a common traffic channel including a first rate group 24ea for transmitting data to the AT 20a, a common traffic channel including a second rate group 24eb for transmitting data to the AT 20b, and a common traffic channel including a third rate group 24ec for transmitting data to the AT 20c. In an exemplary embodiment, within each rate group, 24ea, 24eb, and 24ec, data is transmitted at a different rate. Thus, in an illustrative embodiment, the common traffic channel 24e may include a plurality of rate groups, 24ea, 24eb, and 24ec, with each rate group signal transmitting short data bursts at different rates of transmission.

Figure 3B:
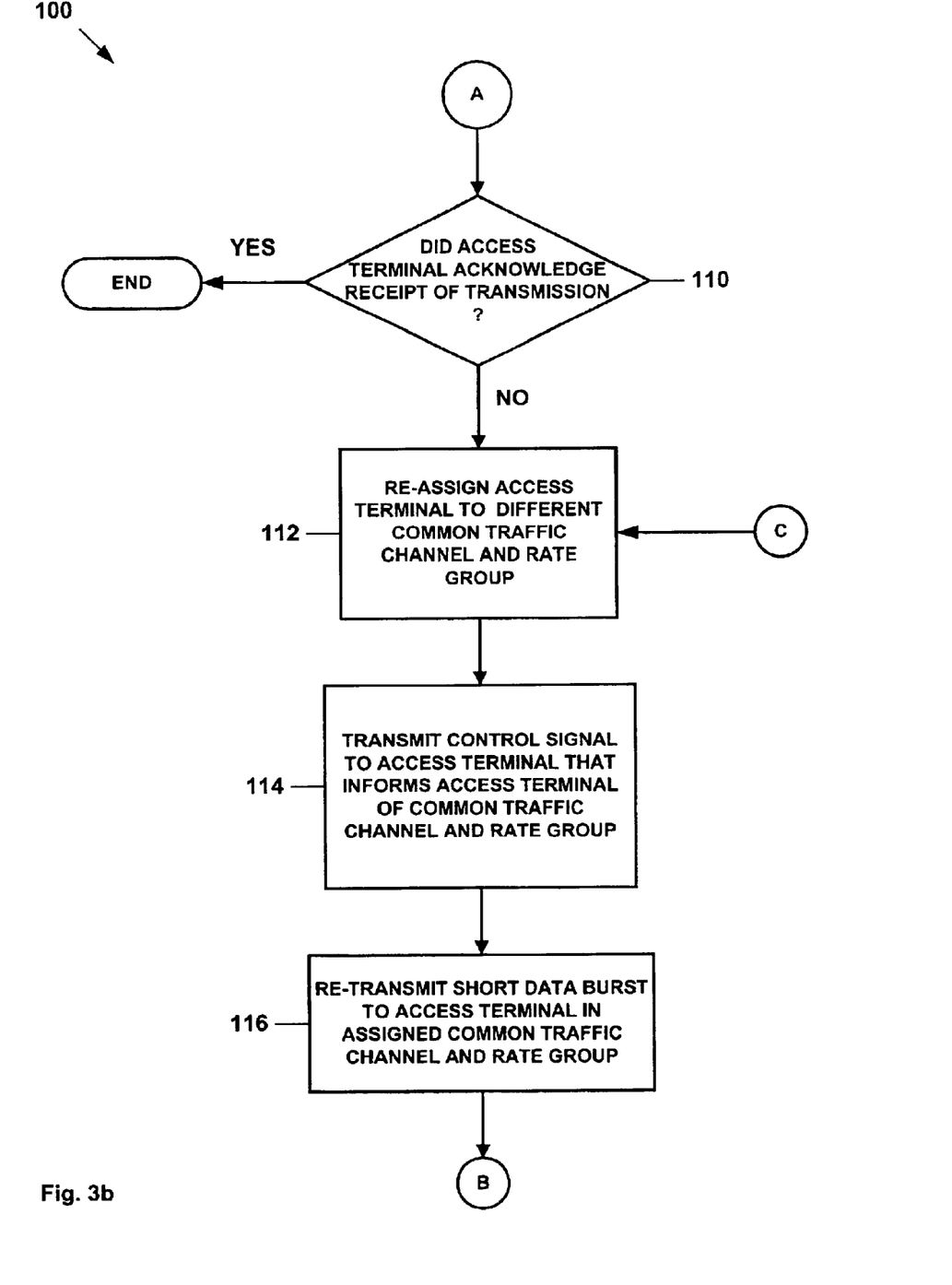

If the AT 20 does not acknowledge receipt of the short data bursts in step 110, then the AP 18 may re-assign the AT to a different common access channel and/or rate group in step 112. In an exemplary embodiment, if the AT 20 does not acknowledge receipt of the short data bursts in step 110, then the AP 18 reassigns the AT to a rate group having a lower rate of data transmission in step 112 in order to ensure proper receipt of the short data burst by the AT. In this manner, if the forward communication link 24 between the AP 18 and AT 20 is degraded by factors such as, for example, movement of the AT relative to the AP, then a lower rate of data transfer is provided in order to ensure proper receipt of the short data burst.

In several alternative embodiments, the new common traffic channel and/or rate group may be selected, for example, as a function of the C/I for the forward communication link and/or by reducing the rate of data transmission, and thereby the assigned rate group, by a preselected amount.

Once the AT 20 has been re-assigned to a different common traffic channel and rate group, then the AP 18 may transmit a control signal to the AT informing the AT of the new control traffic channel and rate group in step 114. The AP 18 may then transmit a short data burst to the AT 20 using the re-assigned common traffic channel and/or rate group in step 116.

Figure 3C:
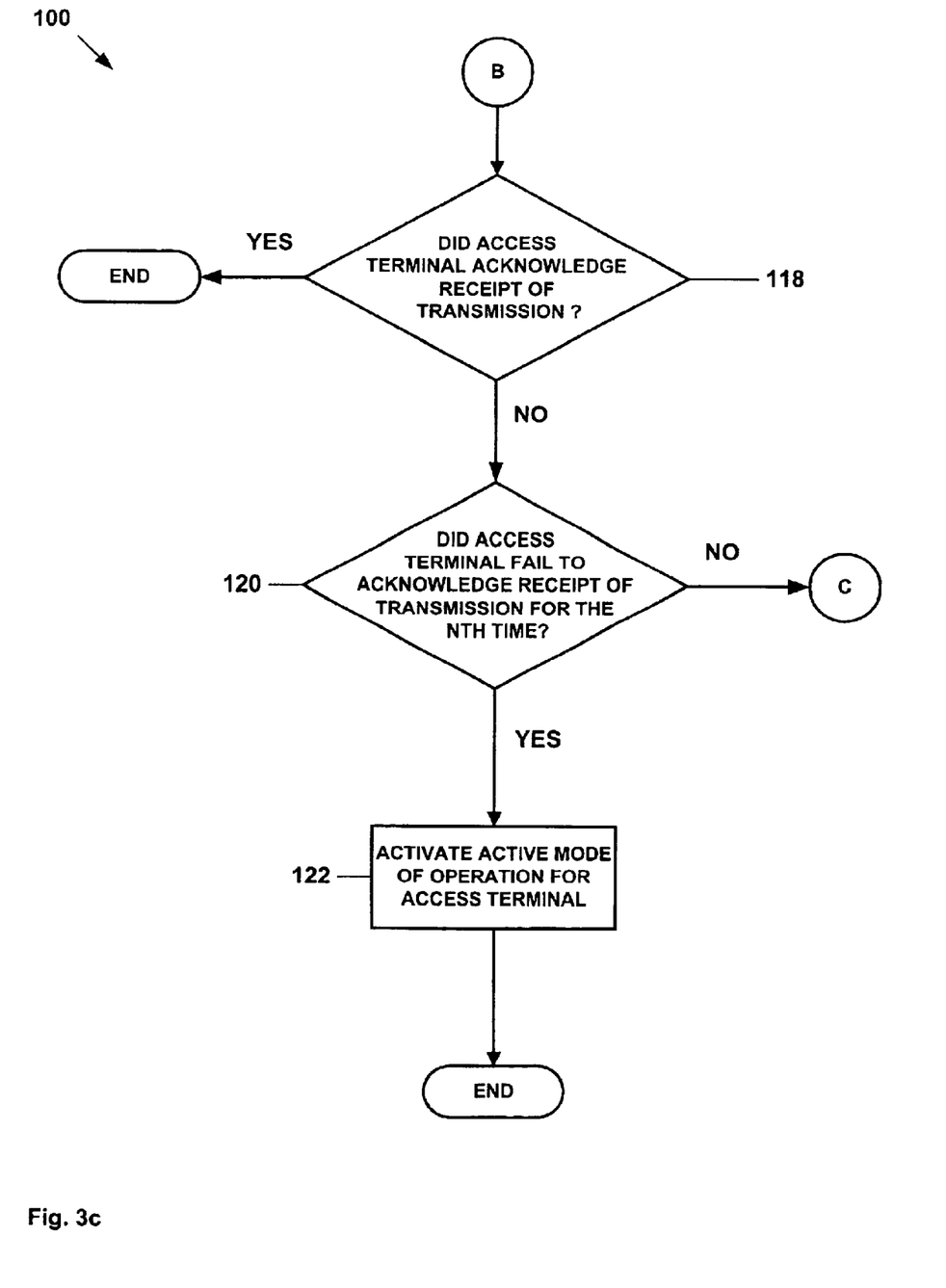

If the AT 20 fails to acknowledge the receipt of the short data bursts in step 118, and, if the AT also fails to acknowledge receipt of the short data burst for the Nth time in step 120, where N is a preselected integer number, then the AT is placed in the active mode of operation by the AP 18 in step 122. Alternatively, if the AT 20 fails to acknowledge receipt of the short data burst for some number of times less than N in step 120, then the AP 18 may re-assign the AT to a different common traffic channel and rate group, transmit the re-assigned common traffic channel and/or rate group to the AT, and transmit a short data burst to the AT using the re-assigned common traffic channel and/or rate group in steps 112, 114, and 116.

Thus, in an exemplary embodiment, the AP 18 may continue to attempt transmitting short data bursts to the AT 20 using steps 112, 114, and 116, until the AT acknowledges receipt of the short data bursts. This process may continue until the AT 20 fails to acknowledge receipt of the short data burst N times. Throughout this process, the AP 18 may continually re-assign the AT 20 to a different common traffic channel and/or rate group in order to successfully transmit the short data bursts. In an exemplary embodiment, throughout this process, the AP 18 may continually re-assign the AT 20 to a rate group having a lower data transmission rate in order to successfully transmit the short data bursts. If the AT 20 fails to acknowledge receipt of the short data bursts N times, then the AP 18 places the AT in an active mode of operation.

Referring to FIGS. 5*a*, 5*b*, 5*c*, 6*a*, 6*b*, and 6*c*, the reference numeral 200 refers, in general, to an alternative embodiment of a method of operating the CDMA/HDR communications network 10 to permit the APs 18 to transmit short data bursts to the ATs 20 in which an AP 18 may initially determine if: (1) an AT 20 is operating in an active mode of operation, or (2) the AT is transitioning to, or operating in, a dormant mode of operation in step 202.

Figure 5A:
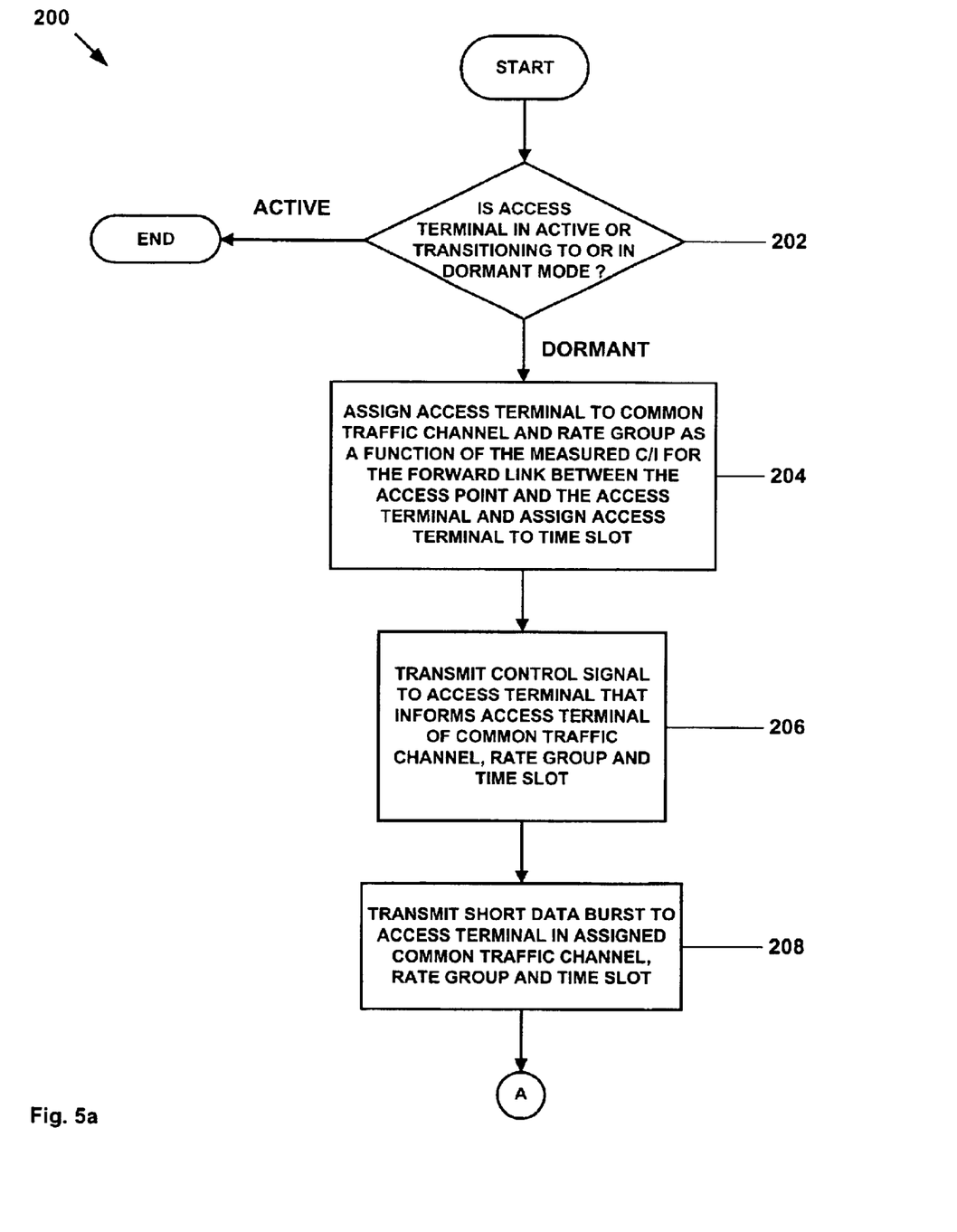
FIGS. 5a–5c are a block diagram of an alternative embodiment of a method of operating the CDMA/HDR communication network of FIG. 1.

If the AT 20 is transitioning to, or operating in, a dormant mode of operation in step 202, then the AP 18 may assign the dormant AT 20 to a common traffic channel and rate group as a function of the measured C/I for the forward communication link between the AP 18 and the AT 20 in step 204. The measured C/I for the forward communication link between the AP 18 and the AT 20 may be provided, for example, by the AT transmitting the measured C/I for the forward communication link to the AP and/or by the AP averaging the measured C/I for the forward communication link provided by the AT prior to entering the dormant mode of operation. The AP 18 may also assign the transmission of the short data burst to the AT 20 to a selected time slot within the common traffic channel in step 204. In this manner, the AT 20 may only be required to listen for the short data burst from the AP 18 during the selected time slot thereby conserving the resources, such as the power consumption, of the AT.

In an illustrative embodiment, the network 10 defines a contiguous or discontiguous communication channel for data, having one or more rate groups, that may be transmitted by the AP 18 to the AT 20 in the forward communications link 24. In an exemplary embodiment, the rate group defines the rate of data transmission within at least a portion of the common traffic channel. For example, the network 10 may define a plurality of contiguous or discontiguous rate groups, with each rate group having an assigned data transmission rate. In this manner, a particular AP 18 may transmit data to a plurality of dormant ATs 20, with each AT 20 assigned to a different rate group. In an exemplary embodiment, the rate of data transmission within the rate groups to the ATs 20 during the dormant mode of operation is less than the rate of data transmission to the ATs during the active mode of operation. The selected time slot for transmission of the short data burst may, for example, include one or more time slots within the assigned common traffic channel.

Once the AT 20 has been assigned to a common traffic channel and rate control group and provided with a time slot in step 204, the AP 18 may transmit a control signal to the AT 20 using a control channel that informs the AT of the common traffic channel, rate group, and time slot assigned to the AT in step 206. The AP 18 may then transmit a short data burst to the AT 20 using the assigned common traffic channel and time slot at the data rate for the assigned rate group in step 208.

Figure 6A:
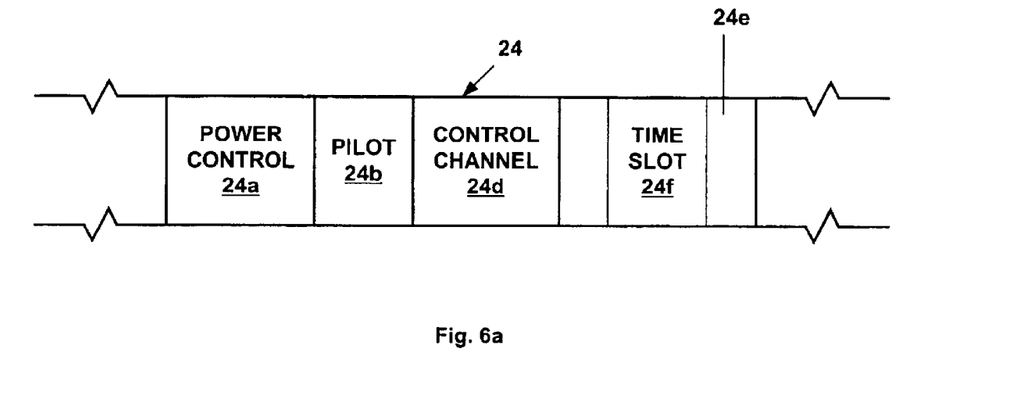
FIG. 6a is a schematic illustration of an embodiment of a forward communication link transmission including a common traffic channel.

Thus, in an exemplary embodiment, as illustrated in FIG. 6*a*, during steps 204, 206 and 208, the forward communications link 24 between the AP 18 and the AT 20 may include the power control channel 24*a*, the pilot channel 24*b*, the control channel 24*d*, and the common traffic channel 24*e* having a time slot 24*f*. The pilot signal transmitted using the pilot channel 24*b* may be received and processed by the AT 20 to generate a measured C/I for the forward communication link 24. The measured C/I may then be transmitted from the AT 20 to the AP 18. The measured C/I may then be used by the AP 18 to assign the AT 20 to a particular control channel and rate group. The control channel 24*d* may then be used to transmit the common traffic channel and rate group assigned to the AT 20 to the AT. The assigned common traffic channel 24*e* may then be used to transmit a short data burst within the assigned time slot 24*f* to the AT 20 using the data rate for the assigned rate group. In this manner, the AT 20 may only be required to listen for the short data bursts during the assigned time slot thereby conserving the resources of the AT.

Figure 6B:
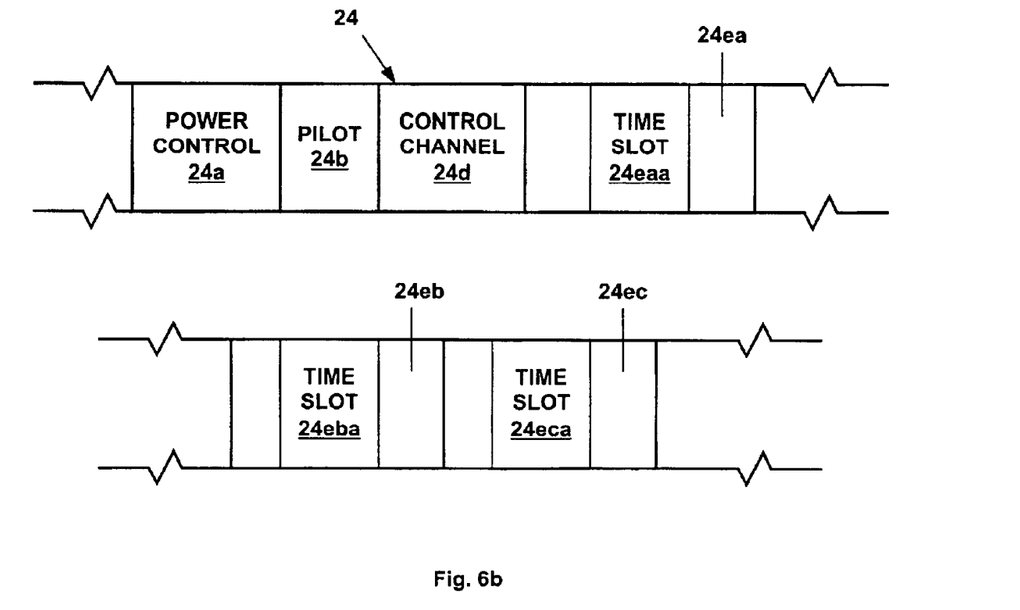
FIG. 6b is a schematic illustration of another embodiment of a forward communication link transmission including a plurality of rate groups.
Figure 6C:
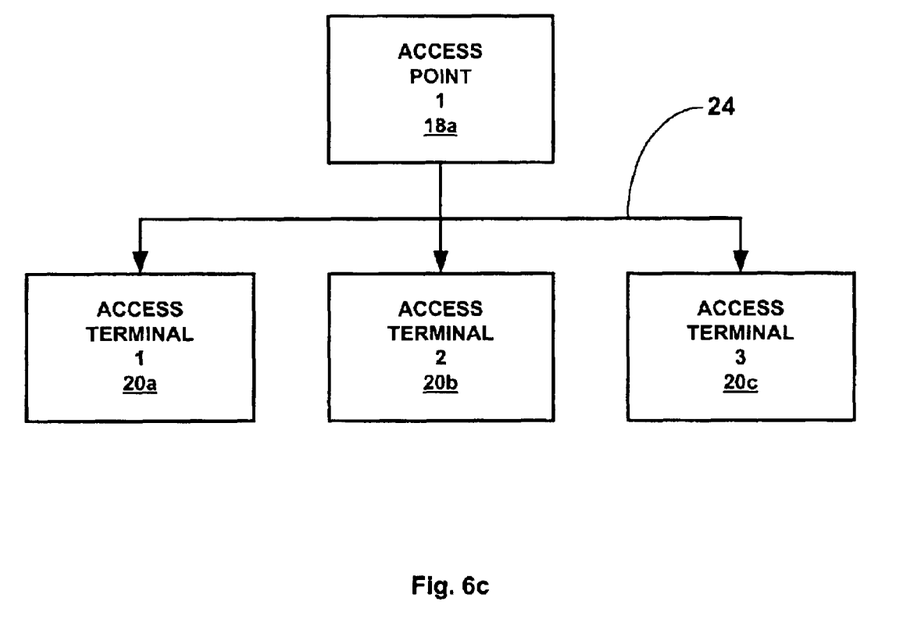
FIG. 6c is a schematic illustration of the transmission of short data bursts to a plurality of access terminals.

More generally, as illustrated in FIGS. 6*b* and 6*c*, for the AP 18*a* transmitting short data bursts to dormant ATs, 20*a*, 20*b*, and 20*c*, using the method 200, the forward communications link 24 between the AP and the ATs may include the power control channel 24*a*, the pilot channel 24*b*, the control channel 24*d*, a common traffic channel including a first rate group 24*ea* having a time slot 24*eaa* for transmitting data to the AT 20*a*, a common traffic channel including a second rate group 24*eb* having a time slot 24*eba* for transmitting data to the AT 20*b*, and a common traffic channel including a third rate group 24*ec* having a time slot 24*eca* for transmitting data to the AT 20*c*. In an illustrative embodiment, the AT 20*a* is assigned to the rate group 24*ea* and time slot 24*eaa*, the AT 20*b* is assigned to the rate group 24*eb* and time slot 24*eba* are assigned to the AT 20*b*, and the AT 20*c* is assigned to the rate group 24*ec* and time slot 24*eca*. In an exemplary embodiment, each rate group signal, 24*ea*, 24*eb*, and 24*ec*, transmit data at a different rate. Thus, in an illustrative embodiment, the common traffic channel 24*e* may include a plurality of rate groups, 24*ea*, 24*eb*, and 24*ec*, with time slots, 24*eaa*, 24*eba*, and 24*eca*, whereby each rate group includes short data bursts that are transmitted at different rates of transmission within time slots assigned to the corresponding ATs 20. More generally, a plurality of ATs 20 may be assigned time slots within the same, or different, rate groups.

Figure 5B:
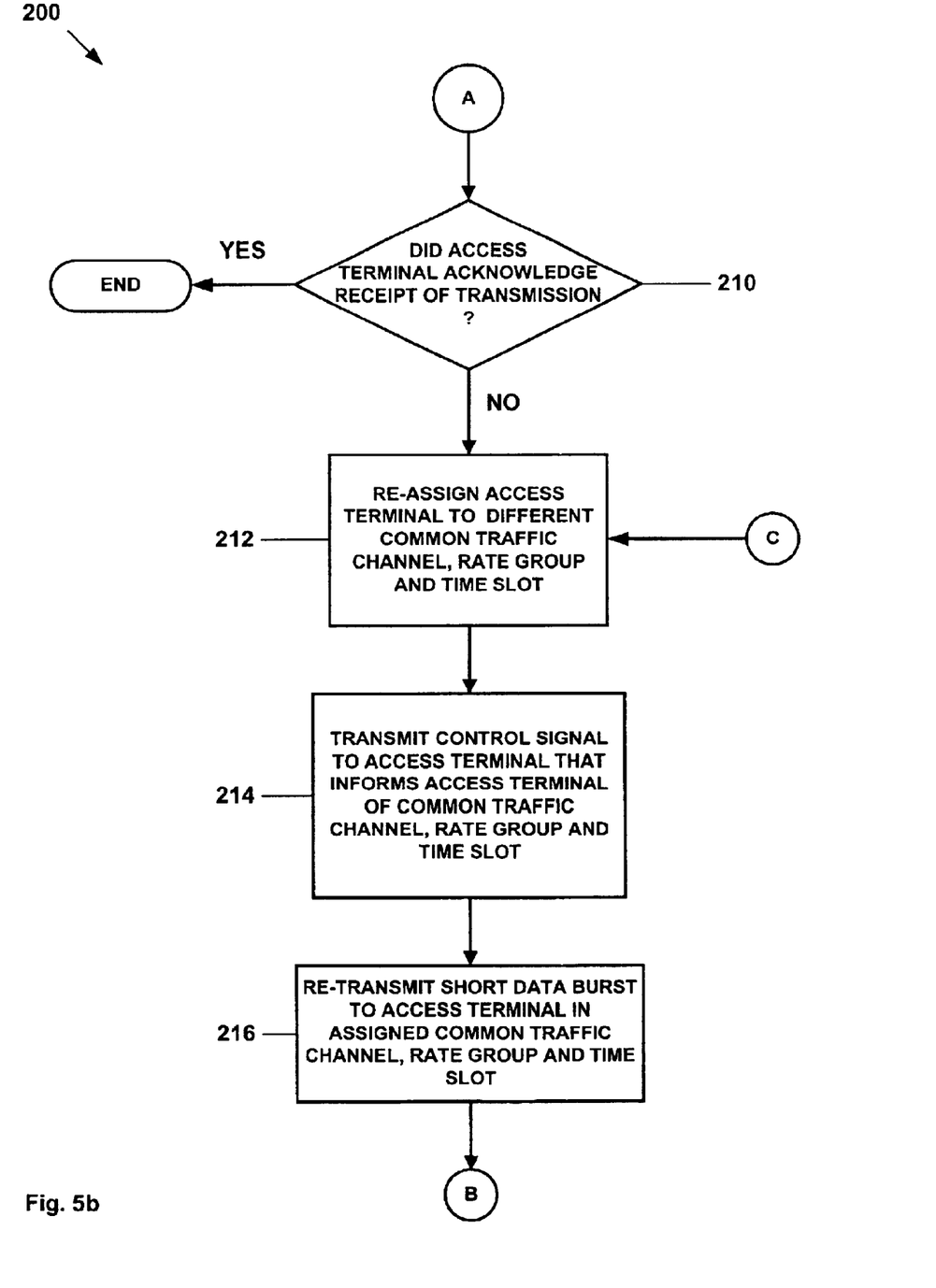

If the AT 20 does not acknowledge receipt of the short data bursts in step 210, then the AP 18 may re-assign the AT to a different common access channel, rate group, and/or time slot in step 212. In an exemplary embodiment, if the AT 20 does not acknowledge receipt of the short data bursts in step 210, then the AP 18 re-assigns the AT to a rate group having a lower rate of data transmission in step 212 in order to ensure proper receipt of the short data burst by the AT. In this manner, if the forward communication link 24 between the AP 18 and AT 20 is degraded by factors such as, for example, movement of the AT relative to the AP, then a lower rate of data transfer is provided in order to ensure proper receipt of the short data burst.

In several alternative embodiments, the new common traffic channel, rate group, and/or time slot may be selected, for example, as a function of the C/I for the forward communication link and/or by reducing the rate of data transmission, and thereby the assigned rate group, by a preselected amount.

Once the AT 20 has been re-assigned to a different common traffic channel, rate group, and/or time slot, then the AP 18 may transmit a control signal to the AT informing the AT of the new common traffic channel, rate group, and/or time slot in step 214. The AP 18 may then transmit a short data burst to the AT 20 using the re-assigned common traffic channel, rate group, and/or time slot in step 216.

Figure 5C:
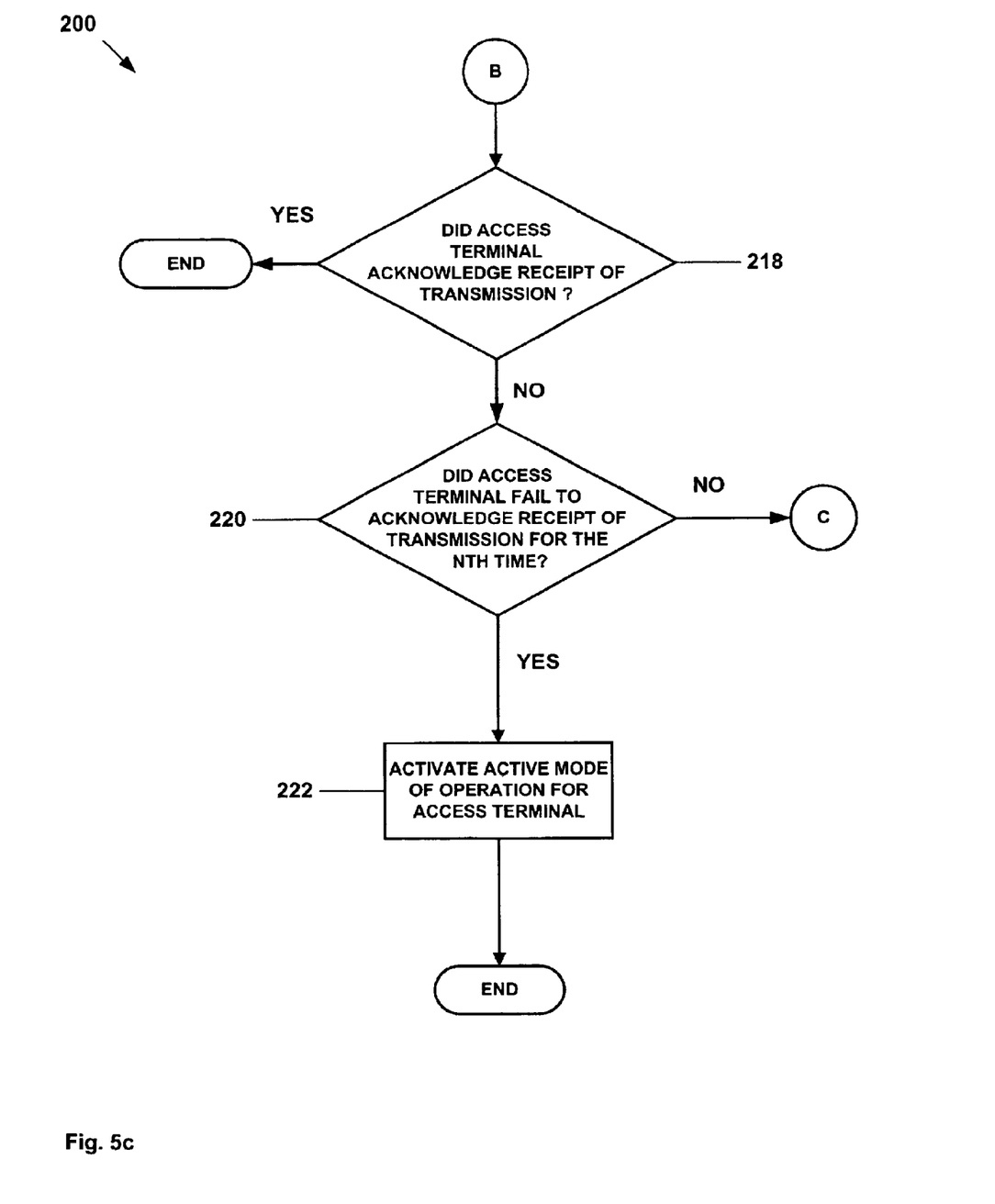

If the AT 20 fails to acknowledge the receipt of the short data bursts in step 218, and, if the AT also fails to acknowledge receipt of the short data burst for the Nth time in step 220, where N is a preselected integer number, then the AT is placed in the active mode of operation by the AP 18 in step 222. Alternatively, if the AT 20 fails to acknowledge receipt of the short data burst for some number of times less than N in step 220, then the AP 18 re-assigns the AT to a different common traffic channel, rate group, and/or time slot, transmits the re-assigned common traffic channel, rate group, and/or time slot information to the AT, and transmits a short data burst to the AT using the re-assigned common traffic channel, rate group, and/or time slot in steps 212, 214, and 216.

Thus, in an exemplary embodiment, the AP 18 may continue to attempt transmitting short data bursts to the AT 20 using steps 212, 214, and 216, until the AT acknowledges receipt of the short data bursts. This process may continue until the AT 20 fails to acknowledge receipt of the short data burst N times. Throughout this process, the AP 18 may continually re-assign the AT 20 to a different common traffic channel, rate group and/or time slot in order to successfully transmit the short data bursts. If the AT 20 fails to acknowledge receipt of the short data bursts N times, then the AP 18 places the AT in an active mode of operation.

More generally, the methods 100 and 200 may simultaneously implemented in the network 10, where some of the ATs 20 receive short data bursts in assigned time slots and some other of the ATs 20 do not receive short data bursts in assigned time slots. More generally still, the methods 100 and 200 may also be implemented to permit a plurality of APs 18 to transmit short data bursts to the ATs 20. In this manner, the present illustrative embodiments provide an extremely flexible communication network that efficiently utilizes the available communication resources. Finally, the teachings of the methods 100 and 200 may implemented in a communication network in which some of the access terminals are in an active mode of operation and some other of the access terminals are in a dormant mode of operation.

The present embodiments of the invention provide a number of advantages. For example, the transmission of short data bursts to the dormant access terminals using common traffic channels permit data transmissions at reduced speed to a plurality of access terminals for whom high data rates may not be required. In this manner, data transmission to the access terminals is provided without having to utilize the high degree of overhead, such as power control and rate control, typically required during an active mode of operation. Thus, a large number of low data rate users can be supported and the overall resources of the communication network are more efficiently utilized. Furthermore, the transmissions of short bursts of data may use a specific data rate for each specific rate group and/or time slot within the common traffic channels. In this manner, the transmission data rate may be maximized while the reliability of the data transmissions may be enhanced. Furthermore, limiting the transmission of data to predefined and specific time slots limits the amount of resources of the access terminals that must be utilized to receive and process the short data bursts. In this manner, the overall operational efficiency of the access terminals is further enhanced, and the access terminal's power consumption is reduced.

It is understood that variations may be made in the foregoing without departing from the scope of the present invention. For example, the assignment of the access terminals to common traffic channels, rate groups, and/or time slots may be made as a function of any number of factors such as, for example, the C/I ratio for the forward communication link, the user density of the cells serviced by the access points, and/or the priority of the particular transmission of data. Furthermore, in the methods 100 and 200, where an access terminal fails to acknowledge the receipt of a short data burst, the access terminal may re-transmit the short data burst without re-assigning the access terminal to a different common traffic channel, rate group and/or time slot. In addition, the teachings of the methods 100 and 200 may be used to permit one or more access points to transmit short data bursts to one or more dormant access terminals. Finally, while the illustrative embodiments are presented with application to a CDMA/HDR communications network, the teachings of the present illustrative embodiments may be applied to any communications network in which access terminals may operate in an active or dormant mode of operation in order to improve the overall utilization and efficiency of the network.

It is understood that other modifications, changes and substitutions are intended in the foregoing disclosure and in some instances some features of the disclosure will be employed without corresponding use of other features.

Accordingly, it is appropriate that the appended claims be construed broadly and in a manner consistent with the scope of the disclosure.

What is claimed is:

1. A method of operating access points in a CDMA/HDR communications network including access terminals capable of operation in an active or a dormant mode of operation, comprising:

one or more of the access points detecting that one or more of the access terminals are operating in or transitioning to a dormant mode of operation;

one or more of the access points assigning one or more of the dormant access terminals to one or more corresponding common traffic channels;

one or more of the access points transmitting short data bursts to one or more of the dormant access terminals using the assigned corresponding common traffic channels;

one or more of the access points detecting that one or more of the dormant access terminals did not acknowledge receipt of the short data bursts;

one or more of the access points re-assigning one or more of the non-acknowledging dormant access terminals to different corresponding common channels; and one or more of the access points re-transmitting the short data bursts to one or more of the non-acknowledging dormant access terminals using the re-assigned common traffic channels.

2. The method of claim 1, further comprising:

one or more of the access points transmitting control signals to one or more of the dormant access terminals that include the corresponding assigned common traffic channels.

3. The method of claim 1, wherein the re-assigned corresponding traffic channels are determined as a function of the carrier to interference ratios for the corresponding forward communication links between the access points and the corresponding dormant access terminals.

4. The method of claim 1, further comprising:

one or more of the access points transmitting control signals to one or more of the non-acknowledging dormant access terminals that include the re-assigned corresponding common traffic channels.

5. The method of claim 1, further comprising:

one or more of the access points detecting that one or more of the dormant access terminals did not acknowledge receipt of the short data bursts N times; and one or more of the access points placing one or more of the N times non-acknowledging dormant access terminals in the active mode of operation.

6. The method of claim 1, further comprising:

one or more of the access points detecting that one or more of the dormant access terminals did not acknowledge receipt of the short data bursts N times.

7. The method of claim 1, further comprising:

one or more of the access points assigning one or more of the dormant access terminals to one or more corresponding common traffic channels and rate groups.

8. The method of claim 7, wherein each rate group designates a corresponding rate of data transmission from the access points to the corresponding dormant access terminals.

9. The method of claim 7, further comprising:

one or more of the access points transmitting control signals to one or more of the dormant access terminal that include the corresponding assigned common traffic channels and rate groups.

10. The method of claim 7, further comprising:

one or more of the access points transmitting short data bursts to one or more of the dormant access terminals using the assigned common traffic channels and rate groups.

11. The method of claim 10, further comprising:

one or more of the access points detecting that one or more of the dormant access terminals did not acknowledge receipt of the short data bursts N times; and one or more of the access points placing one or more of the N times non-acknowledging dormant access terminals in the active mode of operation.

12. The method of claim 10, further comprising:

one or more of the access points detecting that one or more of the dormant access terminals did not acknowledge receipt of the short data bursts N times.

13. The method of claim 1, further comprising:

one or more of the access points assigning the dormant access terminals to one or more corresponding common traffic channels and time slots.

14. The method of claim 13, wherein each time slot designates a time period during which data will be transmitted from the access points to the corresponding dormant access terminals.

15. The method of claim 13, further comprising:

one or more of the access points transmitting control signals to the dormant access terminals that include the corresponding assigned common traffic channels and time slots.

16. The method of claim 13, further comprising:

one or more of the access points transmitting short data bursts to the dormant access terminals using the assigned common traffic channels and time slots.

17. The method of claim 16, further comprising:

one or more of the access points detecting that one or more of the dormant access terminals did not acknowledge receipt of the short data bursts; and one or more of the access points re-transmitting the short data bursts using the assigned corresponding common traffic channels and time slots.

18. The method of claim 16, further comprising:

one or more of the access points detecting that one or more of the dormant access terminals did not acknowledge receipt of the short data bursts N times; and one or more of the access points placing one or more of the N times non-acknowledging dormant access terminals in the active mode of operation.

19. A method of operating access terminals capable of operation in an active mode of operation or a dormant mode of operation in a CDMA/HDR communications network including one or more access points, comprising:

operating one or more of the access terminals in the dormant mode of operation;

one or more of the dormant access terminals receiving short data bursts within common traffic channels assigned to the dormant access terminals;

one or more of the dormant access terminals not acknowledging receipt of the short data bursts; and one or more of the non acknowledging dormant access terminals re-receiving the short data bursts using re-assigned common traffic channels.

20. The method of claim 19, further comprising:
one or more of the dormant access terminals receiving control signals that include the assigned common traffic channels.

21. The method of claim 19, wherein the re-assigned traffic channels are determined as a function of the carrier to interference ratios for the forward communication links between the dormant access terminals and the access points.

22. The method of claim 19, further comprising:
one or more of the dormant access terminals receiving control signals that include the re-assigned corresponding common traffic channels.

23. The method of claim 19, further comprising:
one or more of the dormant access terminals being assigned to rate groups.

24. The method of claim 23, wherein each rate group designates a rate of data reception by one or more of the dormant access terminals.

25. The method of claim 23, further comprising:
one or more of the dormant access terminals receiving control signals that include the assigned common traffic channels and rate groups.

26. The method of claim 23, further comprising:
one or more of the dormant access terminals receiving short data bursts using the assigned common traffic channels and rate groups.

27. The method of claim 19, further comprising:
one or more of the dormant access terminals assigned to one or more time slots.

28. The method of claim 27, wherein each time slot designates a time period during which data will be received by one or more of the dormant access terminals.

29. The method of claim 27, further comprising:
one or more of the dormant access terminals receiving control signals that include the assigned common traffic channels and time slots.

30. The method of claim 27, further comprising:
one or more of the dormant access terminals receiving short data bursts using the assigned common traffic channels and time slots.

31. The method of claim 19, further comprising:
one or more of the dormant access terminals assigned to rate groups and time slots.

32. The method of claim 31, wherein each rate group designates a rate at which data will be received by one or more of the dormant access terminals; and
wherein each time slot designates a time period during which the data will be received by one or more of the dormant access terminals.

33. The method of claim 31, further comprising:
one or more of the dormant access terminals receiving control signals that include the assigned common traffic channels, rate groups, and time slots.

34. The method of claim 31, further comprising:
one or more of the dormant access terminals receiving short data bursts using the assigned common traffic channels, rate groups, and time slots.

35. A communications network, comprising:
one or more access terminals adapted to operate in an active or a dormant mode of operation; and
one or more access points operably coupled to the access terminals;
wherein, if one or more access terminals are operating in or transitioning to a dormant mode of operation, one or more access points are adapted to assign the access terminals to one or more corresponding common traffic channels;
wherein one or more access points are adapted to transmit short data bursts to the dormant access terminals using the assigned corresponding common traffic channels;
wherein if one or more access terminals do not acknowledge receipt of the short data bursts, then one or more access points are adapted to re-assign one or more non-acknowledging access terminals to different corresponding common traffic channels;
wherein one or more access points are adapted to retransmit the short data bursts to one or more non-acknowledging access terminals using the re-assigned common traffic channel.

36. The network of claim 35, wherein one or more access points are adapted to transmit control signals to the dormant access terminals that include the corresponding assigned common traffic channels.

37. A method of operating access points in a CDMA/HDR communications network including access terminals capable of operation in an active or a dormant mode of operation, comprising:
one or more of the access points assigning one or more of dormant access terminals to one or more corresponding common traffic channels;
one or more of the access points detecting that one or more of the dormant access terminals did not acknowledge receipt of short data bursts; and
one or more of the access points re-assigning one or more of the non-acknowledging dormant access terminals to different corresponding common traffic channels.

* * * * *